United States Patent [19]

Ohashi et al.

[11] Patent Number: 4,891,721
[45] Date of Patent: Jan. 2, 1990

[54] MAGNETIC HEAD DEVICE

[75] Inventors: Hiroshi Ohashi, Higashiyamato; Masahiro Kusunoki, Tachikawa, both of Japan

[73] Assignee: Kabushiki Kaisha Toshiba, Kawasaki, Japan

[21] Appl. No.: 201,932

[22] Filed: Jun. 3, 1988

[30] Foreign Application Priority Data

Jun. 5, 1987 [JP] Japan .................. 62-141005

[51] Int. Cl.$^4$ .............................................. G11B 5/60
[52] U.S. Cl. .................................................... 360/103
[58] Field of Search ......................... 360/103–106, 360/119, 121, 125, 128

[56] References Cited

U.S. PATENT DOCUMENTS 4,290,088 9/1981 Beecroft ............................. 360/105
4,709,284 11/1987 Endo .................................. 360/103

FOREIGN PATENT DOCUMENTS 60-55509 3/1985 Japan .

*Primary Examiner*—A. J. Heinz
*Attorney, Agent, or Firm*—Cushman, Darby & Cushman

[57] ABSTRACT

A magnetic head device for use with a high recording density, large memory capacity floppy disk, is disclosed. The slider of the magnetic head device has a contact surface for effecting contact with a disk, the lead/write gap is located at a predetermined position in the contact surface, and the width of the slider contact surface is 1 mm or less.

6 Claims, 7 Drawing Sheets

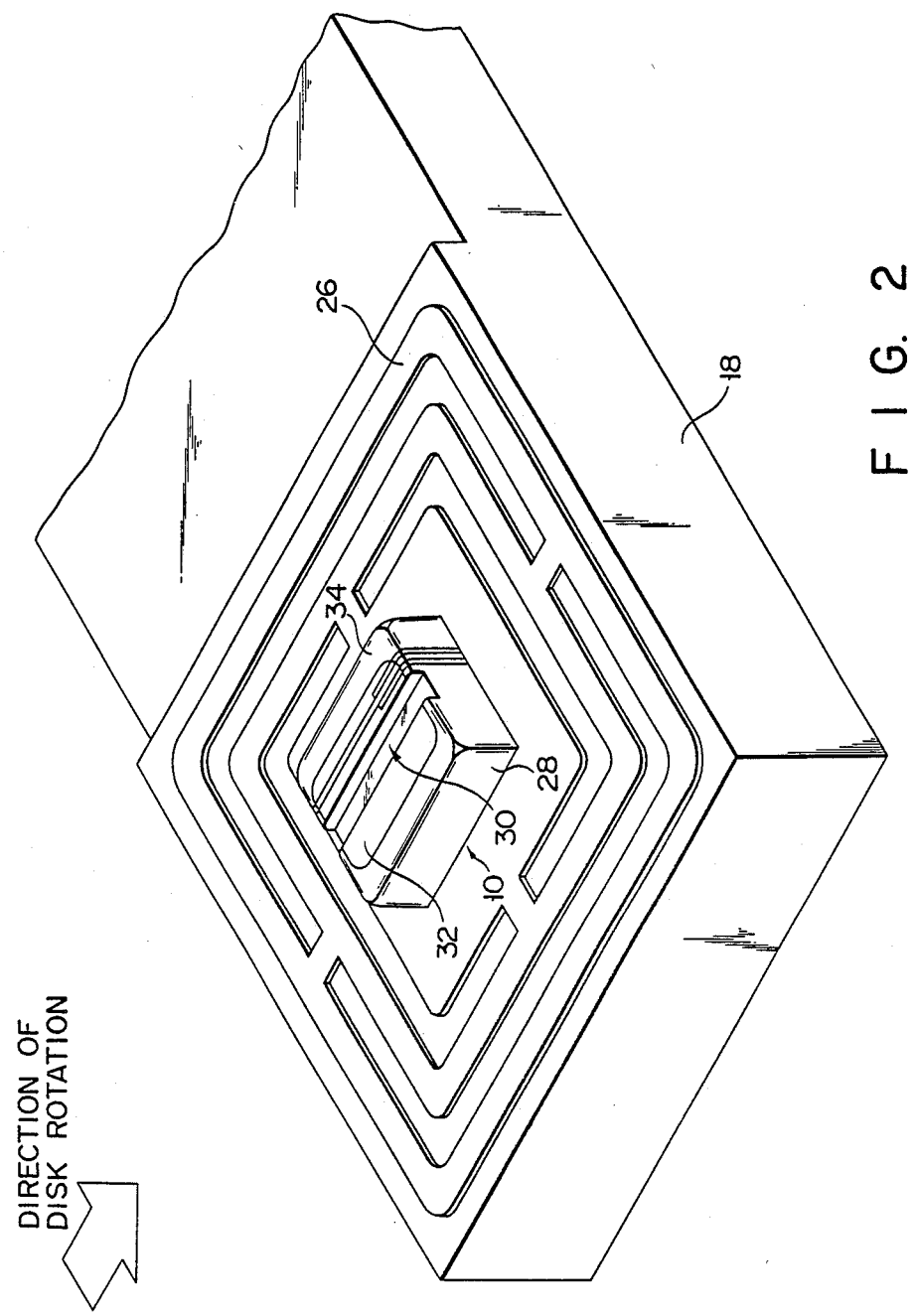

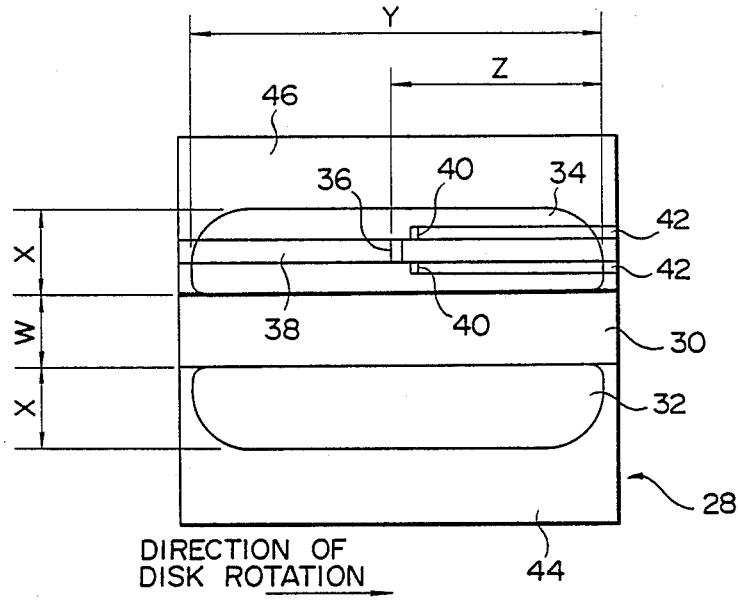
F I G. 3A
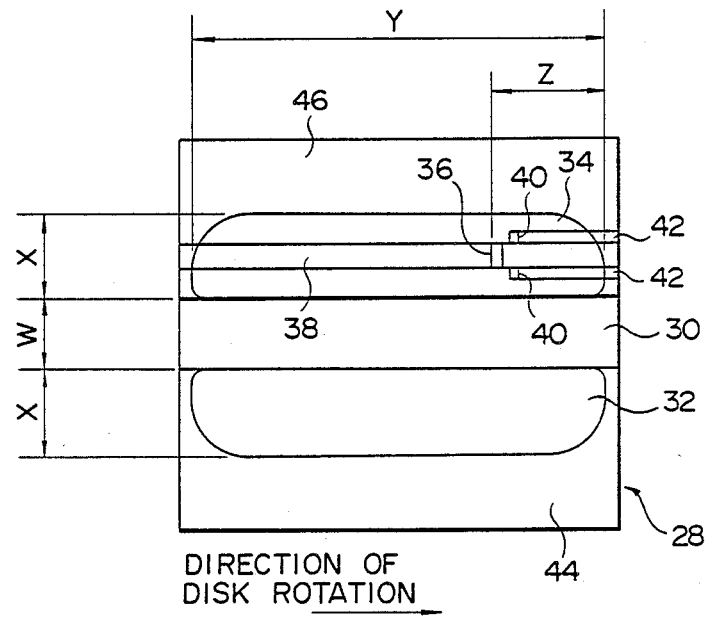
F I G. 3B

MAGNETIC HEAD DEVICE

BACKGROUND OF THE INVENTION

1. Field of the Invention

This invention relates to a magnetic head device used for a floppy disk device and, more particularly, to a magnetic head device for floppy disks of high recording density and large memory capacity.

2. Description of the Related Art

In the usual floppy disk device, the magnetic head is in sliding contact with the surface of a rotating floppy disk during writing data on the disk or reading out data from the disk. The magnetic head is provided with a slider for effecting frictional contact with the disk, and a core with a read/write gap for effecting the writing and reading of data is assembled in the slider.

In the floppy disk device of this type, in which the magnetic head is in contact with the floppy disk for the writing or reading, i.e., recording/reproduction, of data, a read/write gap of the magnetic head and the disk surface are desirably found close to each other. If the distance between the magnetic head and floppy disk, i.e., the spacing distance, is large, and recording/reproduction output is reduced.

In the recent floppy disk device, it is reviewed that the revolving rate of the disk is increased so as to increase the data transfer speed. Further, the load urging the head against the disk surface is reduced for suppressing the wear of the disk. With such a device, the rotation of the disk causes air in the neighborhood of the disk surface to enter the space between the disk and slider of the magnetic head. Therefore, the slider tends to separate from the slider surface, or float in the air over the surface, thus reducing the output of the recording/reproduction. In order to solve this problem, Japanese Patent Application Publication Sho 60-55509 discloses that a read/write gap is arranged in a rear portion of the slider (i.e., in the trailing side with respect to the rotation of the disk).

Recently, however, there has been an attempt of increasing the memory capacity by increasing the recording density of a floppy disk. In this disk, the spacing loss is reduced by reducing the surface roughness compared to the prior art. As data concerning this, FIG. 6 shows measurements of the relation between the relative linear velocity and dynamic friction coefficient in various floppy disks with different memory capacities. The graphs of FIG. 6 show measurements with a usual 3.5-inch floppy disk device. Disks A and B are 1MB (2DD) disks, disk C is a 2MB (2HD) disk, and disks D and E have higher density and larger capacity, say 10 MB class, than disks A, B and C. As the surface of these disks, disk A is coarsest, and the surface is smoother in the order of disks B, C, D and E. The "relative linear velocity" is the relative speed between the head and accessed portion of the disk. As is obvious from the figure, the smoother the disk surface the lower the dynamic friction coefficient. This is particularly pronounced when the relative speed is high. This is so because the smoother the disk surface, the more readily a thin layer of the air is formed on the surface, leading to floating of the magnetic head. With a floppy disk device used with a disk having a large memory capacity, the magnetic head is easily floated, or separated from the disk. For this reason, with such device, even if a read/write gap is provided in a rear portion of the slider, the output of the recording/reproduction is reduced. Further, similar problems may arise with a floppy disk device used with a low recording density disk having a comparatively coarse surface if a disk which has been used for long time and has worn surface is used.

SUMMARY OF THE INVENTION

From the foregoing, an object of the invention is to provide a magnetic head device, which is used for a floppy disk device used with a high recording density and large memory capacity floppy disk, and in which the spacing distance between the disk and slider is reduced to improve the characteristics of the output of recording/reproduction.

To attain the above object of the invention, there is provided a magnetic head device, which comprises a core having a read/write gap for writing data in or reading out data from a floppy disk, and a slider for contacting to slide with said disk, said core being assembled in said slider, said slider having a contact surface with said disk, said read/write gap being located in said contact surface, the size of said contact surface in a direction perpendicular to a direction of the movement of said magnetic head relative to said disk being 1 mm or below.

BRIEF DESCRIPTION OF THE DRAWINGS

FIGS. 1 to 3A and 3B illustrate an embodiment of the magnetic head device according to the invention, in which FIG. 1 is a schematic perspective view showing the same embodiment;

FIG. 2 is a perspective view showing the same in detail; and

FIGS. 3A and 3B are plan views showing a slider;

DETAILED DESCRIPTION OF THE PREFERRED EMBODIMENTS

Now, an embodiment of the present invention will be described in detail with reference to the drawings.

Figure 1:
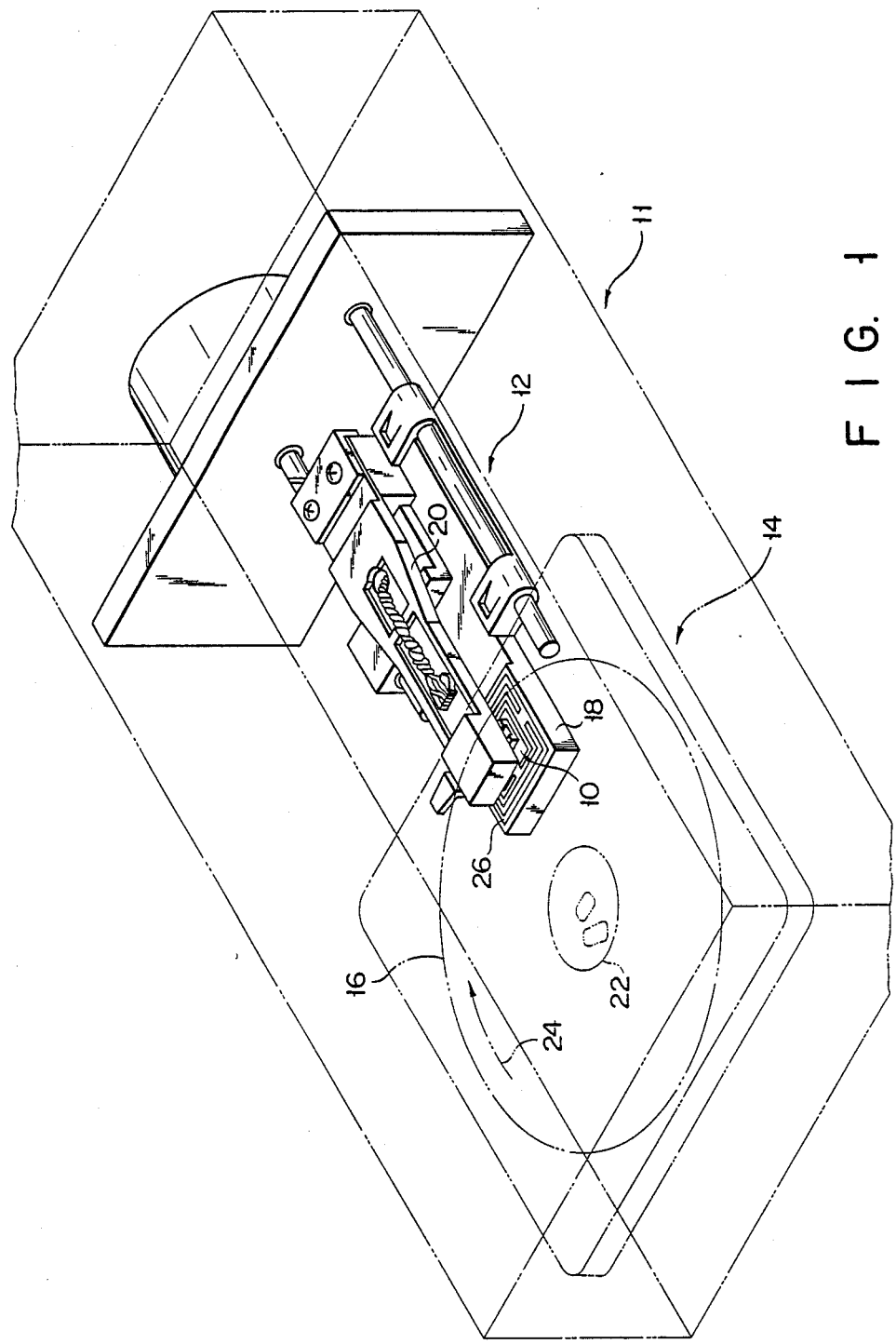

FIG. 1 shows an embodiment of the magnetic head device according to the invention used for double-side type floppy disk device 11. A pair of magnetic head devices 10 are supported on carriage device 12 of floppy disk device 11 and can be brought by carriage 12 into contact with a disk 16 of floppy disk assembly 14. One of the magnetic head devices 10 is supported on carriage body 18 of carriage device 12, while the other magnetic head device 10 is supported on carriage arm 20. The two magnetic head devices face each other, and floppy disk 16 is interposed between their opposed surfaces. Carriage body 18 and carriage arm 20 are biased by spring (not shown) such that the pair of magnetic head devices 10 approach each other. Thus, when magnetic head device 10 and disk 16 are in contact with each other, a slider loading force is generated by the spring. Floppy disk 16 loaded in floppy disk device 11 is driven by a drive unit (not shown) via hub 22 to rotate in the direction of arrow 24. Magnetic head device 10 provided on carriage body 18 and that provided on carriage arm 20 have substantially the same construction, so only magnetic head device 10 provided on carriage body 18 will be explained. As shown in detail in FIG. 2, magnetic head device 10 is mounted in a substantially central portion of a gimbal plate 26 mounted on an end portion of carriage body 18. The posture of magnetic head device 10 with respect to the carriage body 18 is variable by the action of plate 26. Hence, magnetic head device 10 can be in reliable contact with the surface of disk 16 during reading and writing. Read/write coil and other apparatus which are well known in the art, are arranged on the opposite side of gimbal plate 26. As is apparent from FIG. 2, magnetic head device 10 has substantially rectangular slider 28. Slider 28 extends in a tangential direction of the rotation of disk 16, i.e., direction of relative movement of magnetic head device 10 and disk 16. The top surface of slider 28 is provided with a groove 30 extending along its longitudinal central line. Slider 28 thus has two contact surfaces 32 and 34. As is apparent from the plan views of FIGS. 3A and 3B, contact surfaces 32 and 34 have substantially rectangular shape, respectively. The periphery of contact surfaces 32 and 34 are smaller than the periphery of top of the slider. In other words, the slider top has rounded corners.

As is apparent from the plan views shown in FIGS. 3A and 3B, slider 28 has read/write core 38 with read/write gap 36, a pair of erase cores 42, which are provided on each side of read/write core 38 with respect to longitudinal direction respectively and having erase gaps 40, and holders 44 and 46 disposed laterally on both sides of these cores. Read/write core 38 and erase cores 42 are provided on one half of slider 28. Read/write gap 36 and erase gaps 40 are provided on contact surface 34 of slider 28 and extend in a direction substantially perpendicular to the longitudinal direction of slider 28. Read/write core 38 and erase core 42 are made of a well-known core material, and holders 44 and 46 are made of a well-known material, e.g., ceramics. FIGS. 3A and 3B show different examples, which are substantially the same except for that the positions of read/write gap 36 and erase gaps 40. In these examples, respective length Y of contact surface 32, 34 of slider 28 is about 3.6 mm. In the example of FIG. 3A, read/write gap 36 is provided at a longitudinally central position of slider 28, i.e., a position at a distance of 1.8 mm from the rear edge of contact surfaces 34. In the example of FIG. 3B, it is provided at a position of 0.6 mm from the rear edge or trailing edge, which is within one-fourth of the whole length of contact surfaces 34. In this embodiment, the gap length of read/write gap 36 is set to 0.3 to 0.5 mm with respect to a high recording density, large memory capacity floppy disk.

Figure 7A:
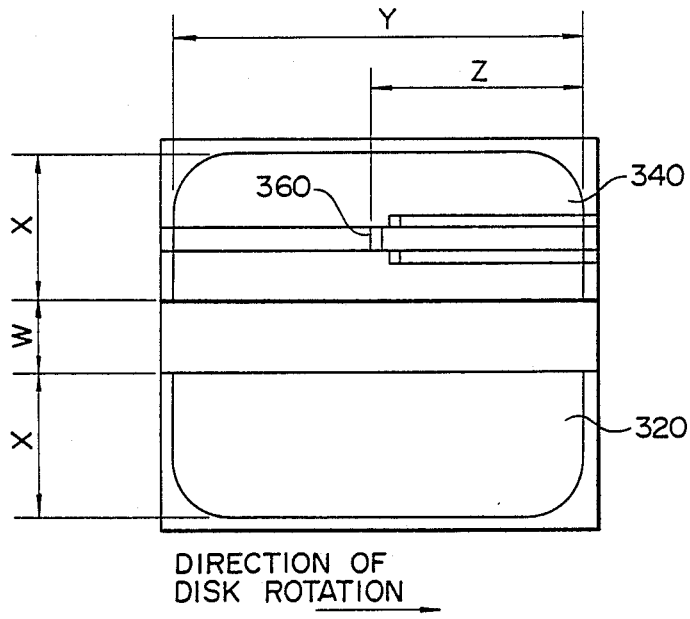
FIGS. 7A and 7B are plan views similar to FIGS. 3A and 3B but showing a prior art magnetic head device.
Figure 7B:
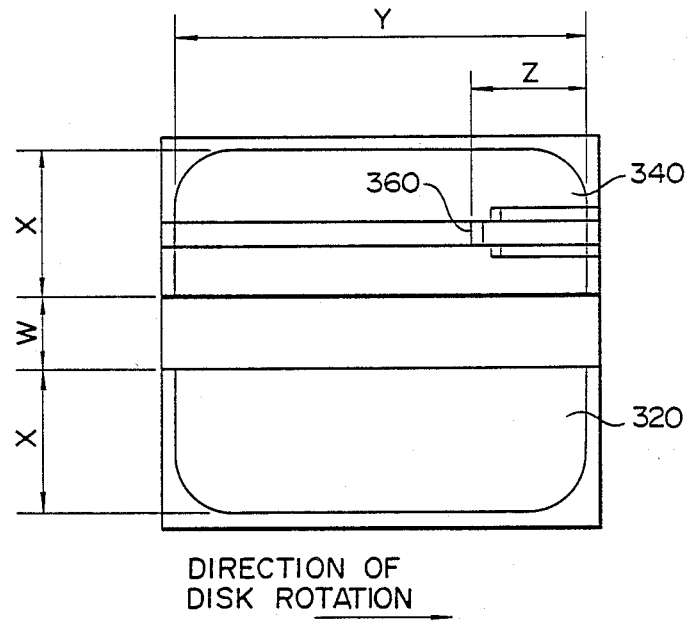

FIGS. 7A and 7B show prior art magnetic head devices similar to the magnetic head device according to the invention for the sake of comparison. These Figures are plan views showing sliders of prior art magnetic head devices corresponding to FIGS. 3A and 3B. The prior art magnetic head devices are greatly different in the width X of the contact surface of the slider from the magnetic head device according to the invention. The width X of the contact surface of the slider is the maximum size of the contact surface in a direction perpendicular to a tangential direction to the rotation of the disk. With the prior art magnetic head devices, as shown in FIGS. 7A and 7B, the width of contact surfaces 320 and 340 of the sliders is about 1.2 mm in relation to the size of the slider. In the embodiments of the invention shown in FIGS. 3A and 3B, the width X of contact surfaces 32 and 34 of sliders 28 are about 0.7 mm. The width W of groove 30 located between contact surfaces 32 and 34 is about 0.6 mm.

The floppy disk device with the magnetic head device 10 according to the invention operates as follows. High recording density, large memory capacity floppy disk assembly 14 is loaded in floppy disk device 11. Floppy disk 16 is driven by a driving device and rotated at a high revolving rate of 900 to 1,500 rpm. When writing data in and reading out data from disk 16, slider 28 of magnetic head device 10 is in contact with the surface of rotating disk 16 and slides along the surface to effect writing and reading of data. In this case, a pair of magnetic head devices 10 mounted on carriage body 18 and carriage arm 20 of carriage device 12 are urged by springs to clamp disk 16 with a slider urging force of about 20 g.

Figure 4:
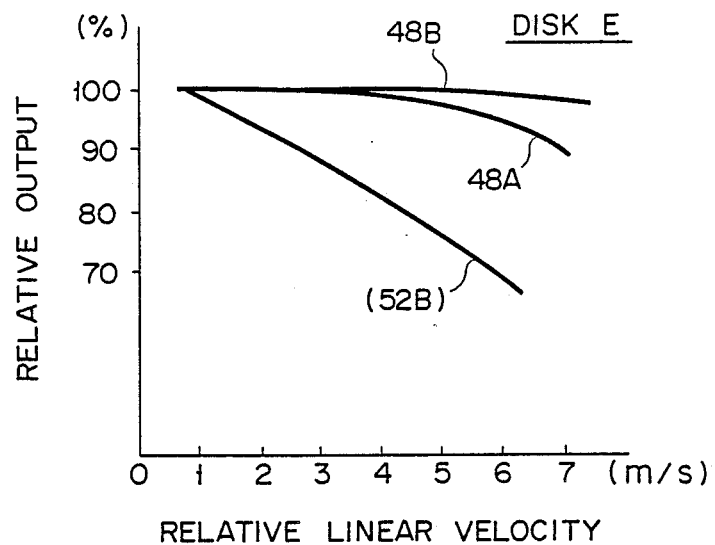
FIG. 4 is a graph showing the relation between relative linear velocity and relative output of recording/reproduction in a floppy disk device using a magnetic head device according to the invention.
Figure 6:
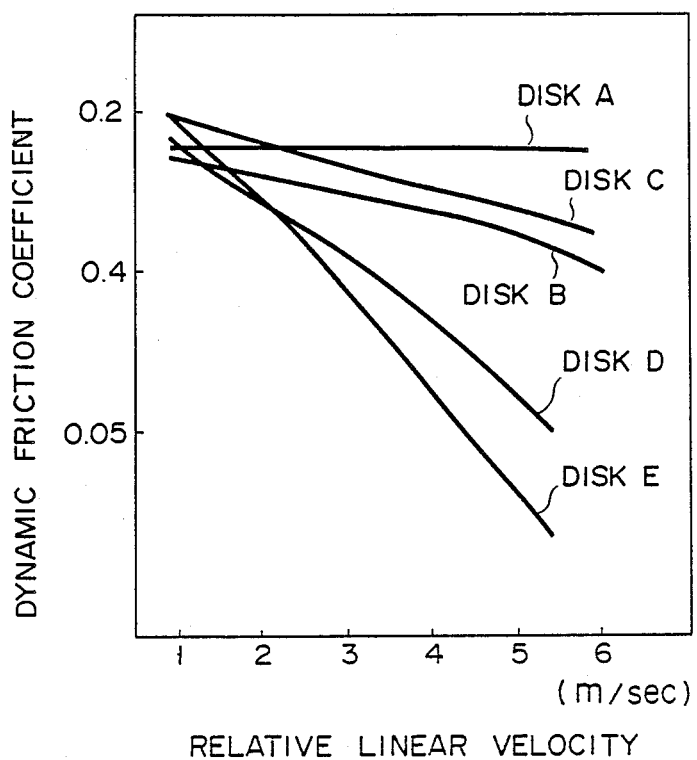
FIG. 6 is a graph showing the relation between dynamic frictional coefficient and relative linear velocity of various floppy disks loaded in a prior art floppy disk device.
Figure 8:
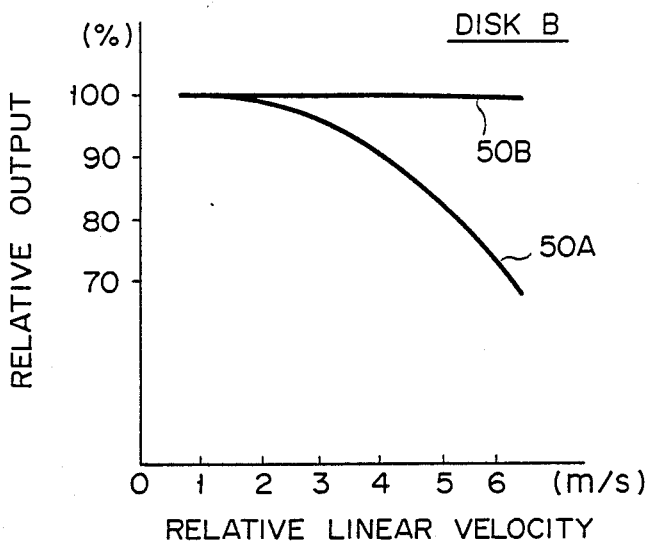
FIGS. 8 and 9 are graphs similar to FIG. 4 but showing like relation in a floppy disk device using the prior art magnetic head device shown in FIGS. 7A and 7B.
Figure 9:
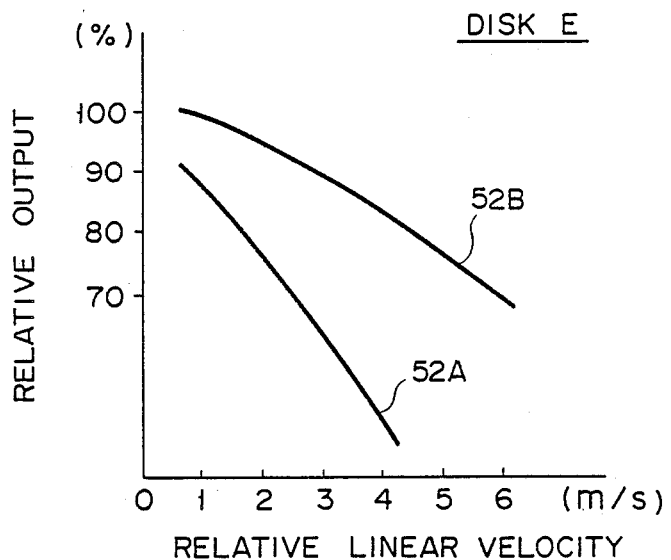

FIG. 4 shows the relation between the relative output of recording/reproduction and relative linear velocity in case when recording/reproduction is done with respect to a large memory capacity floppy disk using a floppy disk device, in which magnetic head device 10 according to the invention shown in FIGS. 3A and 3B is assembled. This floppy disk is the same as the disk E of the graph shown in FIG. 6. In FIG. 4, curve 48A shows a case, in which magnetic head device 10 with slider 28 shown in FIG. 3A is used, and curve 48B shows a case, in which magnetic head device 10 with slider 28 shown in FIG. 3B is used. FIGS. 8 and 9 show graphs similar to the graph of FIG. 4 in floppy disk devices using prior art magnetic head devices shown in FIGS. 7A and 7B. The graph of FIG. 8 is obtained in case when the same low recording density floppy disk as the disk B of the graph shown in FIG. 6 is used for a prior art floppy disk device. The graph of FIG. 9 is obtained in case when the same high recording density floppy disk as the disk E of the graph shown in FIG. 6 is used for a prior art floppy disk device. In FIGS. 8 and 9, curves 50A and 52A are obtained when the magnetic head device with slider as shown in FIG. 7A is used, and curves 50B and 52B are obtained when the magnetic head device with slider shown in FIG. 7B is used. As is apparent from FIG. 8, even where a low recording density floppy disk (disk B) is used, the slider is floated from the disk if the revolving rate of the disk is high, and the magnetic head output of recording/reproduction is reduced as shown in curve 50A. The output reduction can be avoided as shown in curve 50B by disposing a read/write gap at a suitable position in FIG. 7B. This is so because it is possible to reduce the spacing distance of the read/write gap 36 and disk 16, as the read/write gap is located rearwardly of the slider. However, when the high recording density floppy disk (disk E) is used, the disk surface is smoother. Therefore, as shown in FIG. 9, the slider 28 is greatly floated to increase the spacing distance. Thus, the output of recording/reproduction is extremely reduced with increase of the revolving rate of the disk, as shown by curve 52A. With such large spacing distance, even when the read/write gap is provided in a suitable position as shown in FIG. 7B, the output of recording/reproduction is reduced with crease of the revolution of disk 16 as shown in curve 52B.

On the other hand, as is apparent from FIG. 4, with the floppy disk device using the magnetic head device according to the invention, the reduction of the output of recording/reproduction is suppressed as shown by curves 48A and 48B even if the revolving rate of the disk is high. Particularly, when the read/write gap is located at a suitable position as shown in FIG. 3B, as shown in curve 48B, the output of recording/reproduction is hardly reduced even if a maximum relative linear velocity of 5 to 6 m/sec. conceivable for the existing floppy disk device is attained.

This is so because the size of contact surfaces 32 and 34 of slider 28 in contact with disk 16 in a direction perpendicular to the running direction of disk 16, i.e., width X of contact surfaces 32 and 34, and air sticking to contact surfaces 32 and 34 of the slider and entering the space between contact surfaces 32 and 34 and surfaces of disk 16 is reduced, so that the floating of slider 28 is suppressed.

Figure 5:
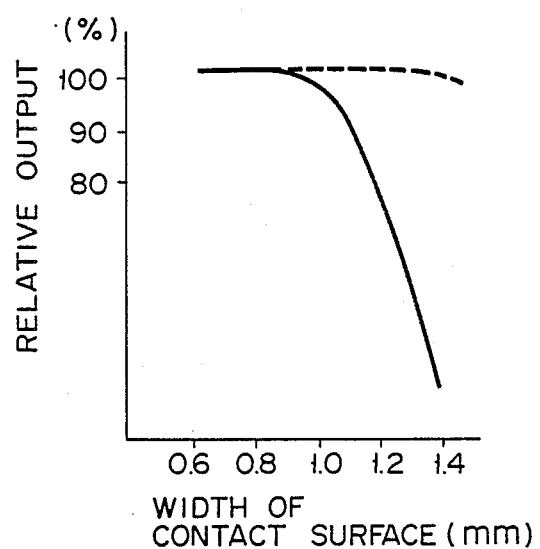
FIG. 5 is a graph showing the relation between the width of a contact surface of a slider and relative output of recording/reproduction in a magnetic head according to the invention.

In FIG. 5, solid curve shows the relation between the width of contact surfaces 32 and 34 of slider and relative output of recording/reproduction in a floppy disk device using a magnetic head device according to the invention. In this case, the output when the width X of slider contact surfaces 32 and 34 is 0.6 mm, is made the reference of the relative output. Broken curve in the Figure is obtained in the floppy disk device with a prior art magnetic head device in which a low recording density floppy disk is loaded. As is obvious from the Figure, with the floppy disk device used with a high recording density, large memory output disk, the output of recording/reproduction is extremely reduced when the width of contact surfaces 32 and 34 of slider exceeds about 1.0 mm. For this reason, the width of the slider contact surfaces or below sufficiently even in the case of the floppy disk device used with a large memory capacity floppy disk.

The magnetic head device having the above construction is used for a floppy disk device used with a high recording density, large memory capacity floppy disk and permits reduction of the spacing distance between the disk and slider in the recording and reproduction of data. Thus, with the floppy disk device using a magnetic head device according to the invention, it is possible to obtain greatly improved characteristics of the output of recording/reproduction over the prior art.

Further, the embodiments described above are by no means limited, and various changes and modifications are possible without departing from the scope and the spirit of the invention.

What is claimed is:

1. A magnetic head device used for a magnetic disk recording/reproducing apparatus, in which a flexible magnetic disk can be loaded, and said magnetic head is contacted with said loaded magnetic disk for writing data in or reading out data from said magnetic disk, said device comprising:

a core having a read/write gap for writing data in or reading out data from said magnetic disk; and a slider for effecting contact with said magnetic disk, said slider being provided with said core and having a flat contact surface to be in contact with said magnetic disk, said read/write gap being arranged in said flat contact surface, said flat contact surface extending in the direction of relative movement between said magnetic head and said magnetic disk, the width of said flat contact surface being 1 mm or less, said width constituting a size of said flat contact surface in a direction perpendicular to the direction of relative movement between said magnetic head and said magnetic head and said magnetic disk.

2. The magnetic head device according to claim 1, wherein the gap length of said read/write gap is 0.3 to 0.5 $\mu$m.

3. The magnetic head device according to claim 1, wherein the relative linear velocity of said movement of said magnetic disk relative to said magnetic head is in a range not higher than 7.3 m/sec.

4. A magnetic head device according to claim 1, wherein said read/write gap is arranged in a trailing part of said contact surface, with respect to said relative motion, said trailing part being located within one-fourth of the entire length of said contact surface of said slider, said length constituting a size in a direction of said relative movement of said magnetic head relative to said magnetic disk.

5. A magnetic head device according to claim 4, wherein said slider includes a flat surface facing the magnetic disk and a groove which extends in the direction of relative movement between the magnetic head and the magnetic disk and which divides the flat surface into two flat divisional surfaces, said flat contact surface being constituted by one of the two divisional surfaces.

6. A magnetic head device according to claim 5, wherein the flat surface of said slider has peripheral slanted surface portions, and said flat contact surface is defined by one of the two divisional surfaces not including its peripheral slanted surfaces.

* * * * *